United States Patent [19]

Nakamura et al.

[11] Patent Number: 4,781,262
[45] Date of Patent: Nov. 1, 1988

[54] VEHICLE STEERING SYSTEM

[75] Inventors: Kenji Nakamura; Yasuji Shibahata, both of Yokohama; Yukio Fukunaga, Zushi; Yasumasa Tsubota, Yokosuka; Namio Irie; Junsuke Kuroki, both of Yokohama, all of Japan

[73] Assignee: Nissan Motor Co., Ltd., Japan

[21] Appl. No.: 941,533

[22] Filed: Dec. 10, 1986

Related U.S. Application Data

[63] Continuation of Ser. No. 695,241, Jan. 28, 1985, abandoned.

[30] Foreign Application Priority Data

Jan. 31, 1984 [JP] Japan .................................. 59-15335

[51] Int. Cl.⁴ .............................................. B62D 5/06
[52] U.S. Cl. ..................................... 180/140; 60/386; 91/536; 92/7; 92/131; 280/91; 280/93; 364/424.1
[58] Field of Search ............... 180/140, 141, 142, 143, 180/79, 79.1, 132, 133, 233; 280/91; 364/424.1; 74/388 PS; 60/385, 386; 91/536; 92/7, 131

[56] References Cited

U.S. PATENT DOCUMENTS

| | | | |
|---|---|---|---|
| 3,185,245 | 5/1965 | Hoyt | 280/91 X |
| 3,838,630 | 10/1974 | Kobelt | 92/131 X |
| 4,412,594 | 11/1983 | Furukawa et al. | 180/140 |
| 4,418,780 | 12/1983 | Ito et al. | 180/140 |
| 4,440,254 | 4/1984 | Shibahata et al. | 180/140 |
| 4,441,572 | 4/1984 | Ito et al. | 180/140 |
| 4,588,039 | 5/1986 | Uno et al. | 180/140 |

FOREIGN PATENT DOCUMENTS

| | | | |
|---|---|---|---|
| 3338700 | 4/1984 | Fed. Rep. of Germany | 180/79 |
| 3533009 | 3/1986 | Fed. Rep. of Germany | 180/79 |
| 81270 | 5/1984 | Japan | 180/79 |
| 81271 | 5/1984 | Japan | 180/79 |
| 92260 | 5/1984 | Japan | 180/132 |

Primary Examiner—John J. Love
Assistant Examiner—Mitchell Hill
Attorney, Agent, or Firm—Leydig, Voit & Mayer

[57] ABSTRACT

In a steering system in which both front and rear wheels are steerable, the rear road wheels are adapted to be turned in the direction opposite to the direction of turning of the front road wheels only when a steering wheel is turned with a torque or effort larger than a predetermined value.

7 Claims, 5 Drawing Sheets

VEHICLE STEERING SYSTEM

This application is a continuation of application Ser. No. 695,241 filed Jan. 28, 1985, now abandoned.

BACKGROUND OF THE INVENTION

1. Field of the Invention

The present invention relates to vehicle steering systems in which both front and rear road wheels are steerable.

2. Description of the Prior Art

FIG. 1 of the drawings shows, by way of example, a system for controlling steering of rear road wheels in dependence upon steering of front road wheels, which system is disclosed in U.S. Pat. No. 4,440,254 issued on Apr. 3, 1984 in the name of Shibahata et al and assigned to the same assignee as the subject application.

In FIG. 1, the reference numeral 10 indicates a sub-frame of a semi-trailing arm suspension for rear road wheels 12 and 14. The sub-frame 10 is bolted to a differential gear 16 which is in turn mounted on a vehicle body (not shown) through a pivot pin 18 and an elastomeric insulator 20, so that the sub-frame 10 is rotatable about the pivot pin 18 to steer the rear road wheels 12 and 14. The reference numerals 22 and 24 indicate semi-trailing arms and rear drive axles, respectively.

The sub-frame 10 is also mounted at the opposed ends thereof on the vehicle body through chambered elastomeric insulators 26 and 28. More specifically, each elastomeric insulator 26 or 28 has a cylindrical configuration and is mounted at the outer periphery thereof on the vehicle body and at the central part thereof on the sub-frame 10 through a pin 30 or 32. The elastomeric insulator 26 or 28 is formed with a pair of diametrically opposed variable volume chambers 26a and 26b or 28a and 28b. The chambers 26a and 26b are respectively paired with the chambers 28b and 28a, and the pair of chambers 26a and 28b or 26b and 28a are fluidly connected through conduits 34 or 36 to a directional control valve 38. The directional control valve 38 is in turn fluidly connected through conduits 40 and 42 to a power steering servo and control unit 44 consisting of a power cylinder 46 and a control valve 48. The power steering servo and control unit 44 is for steering front road wheels (not shown) and fluidly connected to a pump 50 and a reservoir 52. The directional control valve 38 is operative to take two valve positions for controlling connections between the conduits 34, 36, 40 and 42 in dependence upon a signal derived from a vehicle speed sensor 54. The reference numeral 56 indicates an amplifier interposed between the directional control valve 38 and the vehicle speed sensor 54.

With the above arrangement, when a steering wheel (not shown) is turned to the left (counterclockwise rotation) during low speed running of a vehicle, the hydraulic fluid pressure in the conduit 40 rises while the conduit 42 is communicated with the reservoir 52 to allow the pressure in the conduits 40 to fall to the atmospheric pressure, thus making it possible to turn the front road wheels to the left under the assist of the power cylinder 46.

During the low speed running of the vehicle, the conduit 40 is communicated with the chambers 26a and 28b through the directional control valve 38 and the conduit 34 as illustrated, thus causing the hydraulic fluid pressure in the chambers 26a and 28b to rise. On the other hand, the chambers 26b and 28a are communicated through the conduit 36, the directional control valve 38 and the conduit 42 with the reservoir 52 to allow the pressure in the chambers 26b and 28a to fall to the atmospheric pressure. The pressure changes in the chambers 26a and 28b cause the sub-frame 10 to rotate about the pivot pin 18 in the clockwise direction in the drawing, thereby turning the rear road wheels 12 and 14 to the right, i.e., to the direction opposite to the direction of turning of the front road wheels.

When the steering wheel is turned to the right during low speed running of the vehicle, the front road wheels are steered to the right, while the rear road wheels are steered to the left.

In the above manner, it becomes possible for the vehicle to make turns of relatively small radii.

Upon high speed running of the vehicle, a signal derived from the vehicle speed sensor 54 is amplified by the amplifier 56 and applied to the directional control valve 38. The directional control valve 38 thus assumes a position other than illustrated in FIG. 1 and connects the conduit 40 to the conduit 36 while the conduit 42 to the conduit 34. In this case, when the steering wheel is turned to the left, for instance, the pressure changes in the chambers 26a and 28b cause the sub-frame 10 to rotate in the counterclockwise direction in the drawing, causing the rear road wheels 12 and 14 to turn to the left, i.e., in the same direction as that of the front road wheels.

In the above described prior art steering system the rear road wheels are turned at any time when the front road wheels are turned, irrespective of the magnitude of a torque or effort with which the steering wheel is rotated.

The prior art steering system has a disadvantage that the rear road wheels tend to oscillate to-and-fro to cause the tail of the vehicle to oscillate sideways during low speed running of the vehicle, resulting in the lowered stability of the vehicle.

Another disadvantage is that the rear road wheels tend to protrude out of the fenders during low speed running of the vehicle, resulting in the possibility that the road wheels strike against something built or constructed.

A further disadvantage is that the vehicle tends to effect a tack-in phenomenon, i.e., tends to make turn of a smaller radius when suddenly decelerated during high speed cornering since the direction to which the rear road wheels are steered during low speed running of the vehicle is reverse to the direction to which they are steered during high speed running, though responding to the same steering of the front road wheels.

SUMMARY OF THE INVENTION

In accordance with the present invention, there is provided a steering system in a motor vehicle having steerable front and rear road wheels, which comprises a steering wheel for turning the front road wheels, and an actuator for actuating the rear road wheels to turn in the direction opposite to the direction of turning of the front road wheels only when the steering wheel is turned with a torque larger than a predetermined value.

This structure is quite effective for overcoming the disadvantages noted above.

It is accordingly an object of the present invention to provide a steering system in a motor vehicle in which both front road wheels are steerable in such a way as to reduce the turning circle of the vehicle without lowering the stability and safety of the vehicle.

BRIEF DESCRIPTION OF THE DRAWINGS

The features and advantages of the vehicle steering system according to the present invention will become more clearly appreciated from the following description taken in conjunction with the accompanying drawings, in which.

DETAILED DESCRIPTION OF THE PREFERRED EMBODIMENTS

Figure 1:
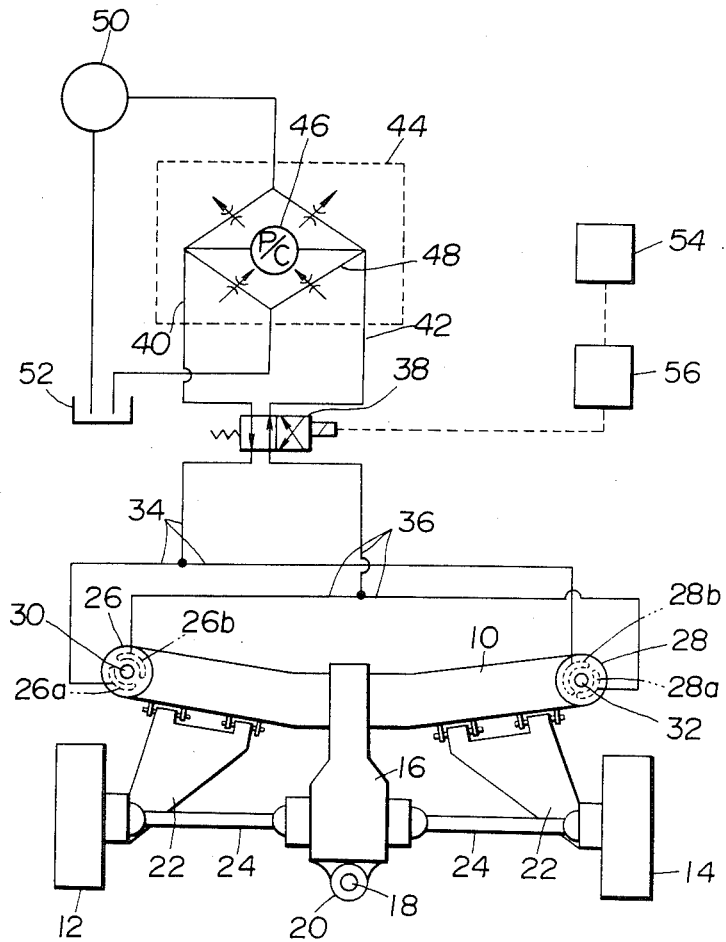
FIG. 1 is a schematic plan view of a vehicle equipped with a prior art steering system.
Figure 2:
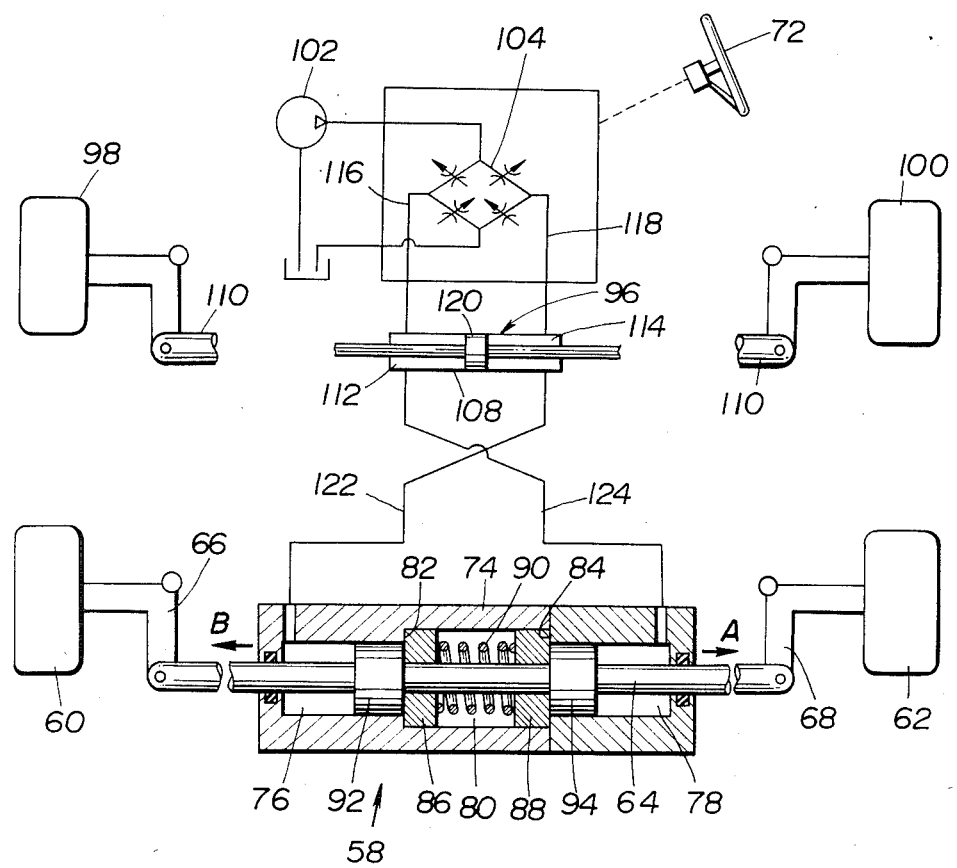
FIG. 2 is a schematic plan view of a vehicle equipped with a steering system according to an embodiment of the present invention.

Referring to FIG. 2, description is first made to an embodiment in which hydraulic fluid pressure produced in a power steering system for front road wheels is utilized for steering rear road wheels.

In FIG. 2, the reference numeral 58 indicates an actuator for the steering of rear road wheels 60 and 62. The actuator 58 is a kind of hydraulic cylinder and comprises a reciprocative actuator rod 64 connected at the opposed ends thereof to oscillatory knuckle arms 66 and 68 which are in turn connected to the rear road wheels 60 and 62. In accordance with the present invention, the actuator 58 is adapted to turn the rear road wheels 60 and 62 only when an effort for turning a steering wheel 72 exceeds a predetermined value.

More specifically, the actuator 58 comprises a hollow cylindrical housing 74 through which the actuator rod 64 passes to project from the opposed ends thereof. The housing 74 has a pair of smaller-diameter cylindrical chambers 76 and 78 and a larger-diameter cylindrical chamber 80 interposed therebetween. The chambers 76, 78 and 80 are axially aligned with each other, and the smaller-diameter chambers 76 and 78 each have a closed end and an open end and are communicated at the open end with the larger-diameter chamber 80 so that a pair of annular shoulders 82 and 84 are formed at the axially opposed ends of the larger-diameter chamber 80. A pair of annular spring seats 86 and 88 are slidably mounted in the larger-diameter chamber 80 and also slidably mounted on the actuator rod 64. Interposed between the spring seats 86 and 88 is a coil spring 90 which is placed in a pre-loaded state around the actuator rod 64 so as to urge the spring seats 86 and 88 against the annular shoulders 82 and 84. A pair of annular pistons 92 and 94 are provided which are slidably disposed in the respective smaller-diameter chambers 76 and 78 in a manner to sealingly close the open ends thereof and fixedly mounted on the actuator rod 64 in a manner to contact the respective spring seats 86 and 88 when the actuator rod 64 is held in the neutral position thereof or when the rear road wheels 60 and 62 are held in the straight ahead positions thereof as shown in the drawing. The larger-diameter chamber 80 is communicated with the atmosphere through an air vent though not shown in the drawing. By this, the actuator rod 64 is caused to move to the right in the drawing only when hydraulic fluid pressure supplied to either of the hydraulic fluid chamber 76 or the hydraulic fluid chamber 78 exceeds a predetermined value and exerts upon the corresponding piston 92 or 94 a force prevailing the opposing force from the coil spring 90, that is, when the hydraulic fluid pressure supplied to either of the hydraulic fluid chamber 76 or the hydraulic fluid chamber 78 is larger than a predetermined value, the corresponding piston 92 or 94 is caused to move together with the associated spring seat 86 or 88 toward the other spring seat 88 or 86 while compressing the coil spring 90. Movement of the actuator rod 64 to the right as indicated by the arrow A in the drawing causes the rear road wheels 60 and 62 to turn to the left. On the other hand, movement of the actuator rod 64 to the left as indicated by the arrow B in the drawing causes the rear road wheels 60 and 62 to turn to the right.

The reference numeral 96 indicates a power steering device which is associated with front road wheels 98 and 100. The power steering device 96 includes a pump 102 and a reservoir 104. A control valve 106 of the power steering is communicated with the pump 102 and the reservoir 104 and responsive to the rotation of the steering wheel 72. A hydraulic servo 108 is operatively connected to a tie rod 110 and fluidly connected to the control valve, 106 in such a manner that when the steering wheel 72 is turned to the left or in the counterclockwise direction, a chamber 112 of the servo 108 is pressurized with hydraulic fluid supplied thereto from the pump 102 through a conduit 116. This drives a piston 120 of the power steering servo 108 to the right in the drawing to assist the steering of the front road wheels 98 and 100. Conversely, when the steering wheel 72 is rotated to the right or in the clockwise direction, a chamber 114 of the servo 108 is pressurized via a conduit 118 and the piston 120 is driven to stroke to the left in the drawing to assist the turning of the front road wheels 98 and 100 to the right.

The chamber 76 of the actuator 58 is fluidly connected through a conduit 122 to the chamber 114 of the servo 108, while the chamber 78 is fluidly connected through a conduit 124 to the chamber 112.

With the above arrangement, when the steering wheel 72 is turned to the left or in the counter-clockwise direction, the conduit 116 is communicated with the pump 102, while the conduit 118 is communicated with the reservoir 104. By this, the chamber 112 of the servo 108 is pressurized, while the chamber 114 is drained. The piston 120 of the servo 108 is thus driven to the right in the drawing to assist the turning of the front road wheels 98 and 100 to the left.

When the steering wheel 72 is turned to the right or in the clockwise direction, the chamber 114 is pressurized while the chamber 112 is drained, resulting in that the piston 120 of the servo 108 is driven to the left in the drawing to assist the turning of the front road wheels 98 and 100 to the right.

Figure 3:
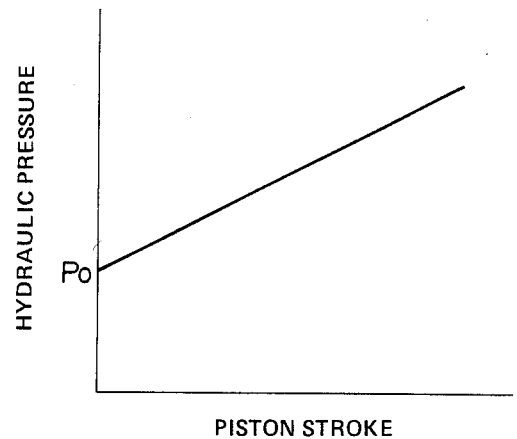
FIG. 3 is a graph showing hydraulic pressure-piston stroke characteristic of an actuator employed in the steering system of FIG. 2.

In the above operation of the power steering 96, when a torque or effort with which the steering wheel 72 is turned is smaller than a predetermined value, the pistons 92 and 94 do not move to the right or left from the neutral position shown in the drawing (corresponding to the straight ahead positions of the rear road wheels) since the hydraulic fluid pressure supplied from the chamber 112 or 114 to the chamber 76 or 78 cannot apply upon the piston 92 or 94 such a driving force that prevails against the force from the spring 90. In other words, with additional reference to FIG. 3, the pistons 92 and 94 do not move, at all but are held at the aforementioned neutral position until the difference in pressure between the chambers 76 and 78 becomes larger than a predetermined value $P_0$, i.e., until the difference in driving force between the pistons 92 and 94 becomes larger than the preload under which the spring 90 is set. When such is the case, the actuator 58 does not actuate the rear road wheels 60 and 62 to turn.

When the aforementioned torque or effort upon the steering wheel 72 becomes larger than a predetermined value to cause the pressure in the chamber 112 or 114 of the power steering servo 108 to become larger than the predetermined value $P_0$, the difference in driving force between the pistons 92 and 94 of the actuator 58 becomes larger than the pre-load of the spring 90 to cause the piston 92 or 94 and therefore the actuator rod 64 to move out of the neutral position shown in the drawing in either direction by the amount corresponding to the difference in pressure between the chambers 76 and 78 of the actuator 58. By this, the rear road wheels 60 and 62 are turned to the left or right by the amount corresponding to the displacement of the pistons 92 and 94 and the actuator rod 64.

Figure 4:
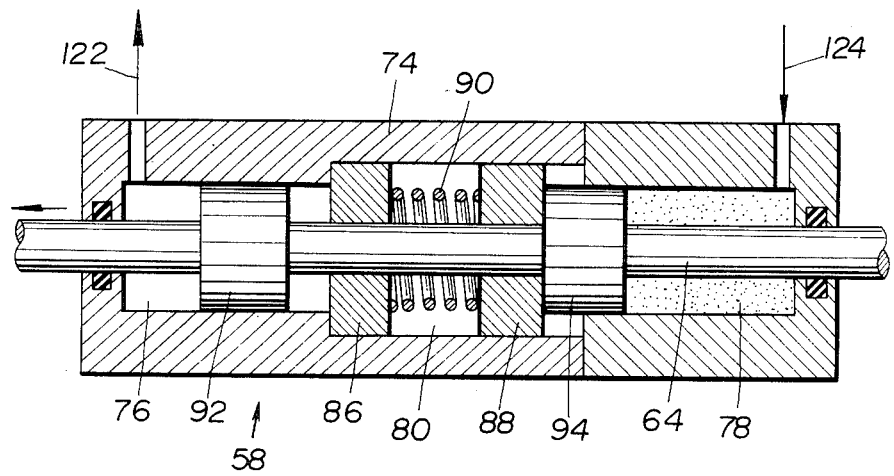
FIG. 4 is an enlarged sectional view of the actuator of FIG. 2.

More specifically, when the steering wheel 72 is turned to the left or in the counterclockwise direction with a torque or effort larger than a predetermined value during leftward turning or cornering of the vehicle, the chamber 112 of the power steering servo 108 and the chamber 78 of the actuator 58 are brought into communication with the pump 102 while the chambers 114 and 76 are drained into the reservoir 104. Since in this instance the difference in pressure between the chambers 76 and 78 becomes larger than the predetermined value $P_0$, not only the leftward turning of the front road wheels 98 and 100 is assisted by the power steering device 96 but the pistons 92 and 94 and the actuator rod 64 of the actuator 58 are cause to move in the leftward direction as shown in FIG. 4, whereby to cause the rear road wheels 60 and 62 to turn to the right. As a result, the radius of the leftward turning circle of the vehicle becomes sufficiently smaller.

When in the above case the torque or effort upon the steering wheel becomes smaller than the predetermined value or decreases to zero, the actuator rod 64 returns to its neutral position shown in FIG. 2 under the bias of the spring 90, causing the rear road wheels 60 and 62 to return to the straight ahead positions thereof.

On the other hand, when the steering wheel 72 is turned to the right or in the clockwise direction with a torque or effort larger than a predetermined value during rightward turning of the vehicle, the difference in pressure between the chambers 76 and 78 becomes larger than the predetermined value $P_0$ to cause the actuator rod 64 to move out of the neutral position shown in the drawing in the rightward direction, whereby to cause the rear road wheels 60 and 62 to turn to the left.

From the foregoing, it is to be understood that the steering system of the present invention is constructed and arranged so that the rear road wheels 60 and 62 are turned in the direction opposite to the direction of turning of the front road wheels 98 and 100 when the aforementioned torque or effort becomes larger than the predetermined value, i.e., mainly upon low speed running of the vehicle, whereby it becomes possible for the vehicle to make turns of relatively small radii.

Figure 5:
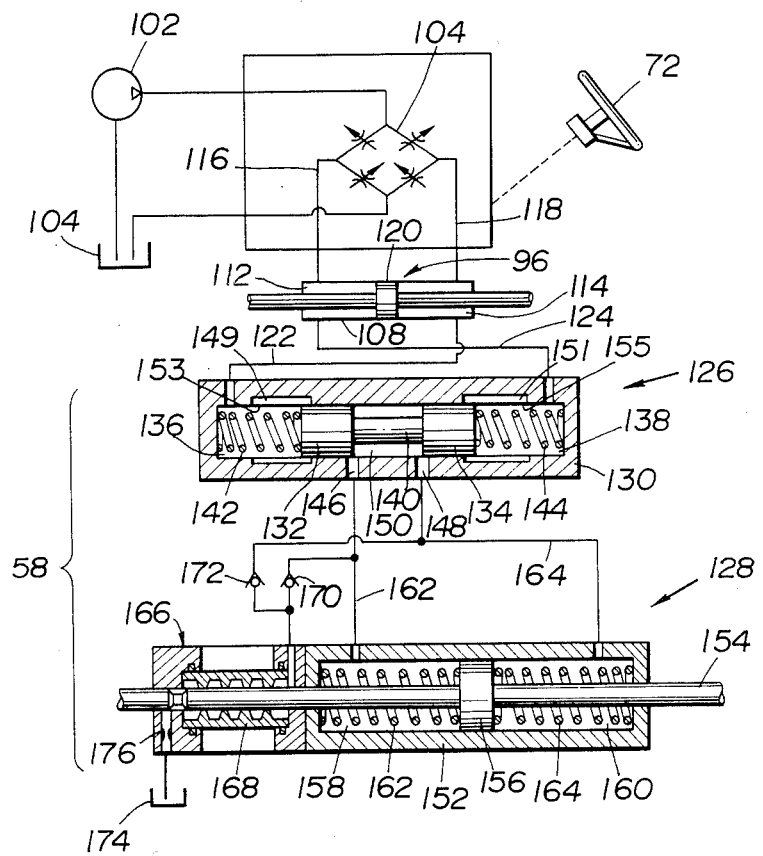
FIG. 5 is a view similar to FIG. 2 but showing a modification according to the present invention.

FIG. 5 shows a modified embodiment in which like or corresponding parts to those of the previous embodiment of FIG. 2 are designated by the identical reference numerals.

This embodiment differs from the previous embodiment of FIG. 2 in that an actuator 58 for steering of the rear road wheels 60 and 62 consists of a control cylinder 126 fluidly connected to the hydraulic servo 108 of the power steering 96 and an actuator cylinder 128 fluidly connected to the control cylinder 126 and operative to directly actuate the rear road wheels 60 and 62 to turn.

The control cylinder 126 comprises a hollow cylindrical housing 130 in which a pair of pistons 132 and 134 are slidably disposed to define a pair of chambers 136 and 138 on the remoter end sides thereof. The pistons 132 and 134 are axially spaced from each other and joined by a rod 140 so as to be movable together. A pair of coil springs 142 and 144 are respectively disposed in the chambers 136 and 138 to urge the pistons 132 and 134 and the rod 140 toward the neutral position thereof or the axially central position in the housing 130. The chamber 136 is fluidly connected to the chamber 114 of the hydraulic servo 108 through the conduit 122, while the chamber 138 is fluidly connected to the chamber 112 through the conduit 124. A pair of ports 146 and 148 are formed in the housing 130 in such a manner as to partially open to a chamber 150 between the pistons 132 and 134 and be partially closed by the closer end portions of the respective pistons 132 and 134 when the pistons and the rod 140 are in the neutral position thereof. When displacement of the pistons 132 and 134 and the rod 140 becomes larger than a predetermined value, one of the ports 146 or 148 opens to the chamber 136 or 138 while the other port 148 or 146 opens to the chamber 150. Two sets of axial grooves 149 and 151 are respectively formed in inner cylindrical walls 153 and 155 of the housing 130 defining the chambers 136 and 138 in such a manner that when the above mentioned displacement of the pistons and the rod becomes larger than the predetermined value to allow the one port 146 or 148 to open to the chamber 136 or 138, one set of grooves 151 or 149 bypass the piston 134 or 132 to establish communication between the chamber 138 or 136 and the chamber 150 with which the other port 148 or 146 is communicated.

The actuator cylinder 128 comprises a hollow cylindrical housing 152 through which a reciprocative actuator rod 154 passes to project from the opposed ends thereof. The actuator rod 154 is operatively connected at the opposed ends thereof to the rear road wheels 60 and 62 though not shown in the drawing. An annular piston 156 is slidably disposed in the housing 152 in a manner to define a pair of chambers 158 and 160 on the opposed end sides thereof and is fixedly mounted on the actuator rod 148 to move together therewith. A pair of coil springs 162 and 164 are respectively disposed in the chambers 158 and 160 so as to urge the piston 156 toward the neutral position thereof or the axially central position in the housing 152. The chamber 158 is fluidly connected to the port 146 of the first actuator cylinder 126 through a conduit 162, while the chamber 160 is fluidly connected to the port 148 through a conduit 164.

On one end side of the housing 152, there is provided a clamping device 166 for clamping the actuator rod 154 stationarily relative to the housing 152 and thereby preventing the rear road wheels 60 and 62 from being steered by the external force applied thereto. The clamping device 166 mainly consists of a radially expansible sleeve member 168 surrounding the actuator rod 154 and seizing and grasping the same stationarily relative to the housing 152 when there is no supply of hydraulic fluid under pressure into the inside of the sleeve member 168. When hydraulic fluid under pressure is supplied into the sleeve member 168, it expands radially outward to release the actuator rod 154 from the clamping. When supply of hydraulic pressure is stopped, the sleeve member 168 radially contracts to seize and clamp the actuator rod 154. The inside of the sleeve member 168 is fluidly connected in parallel to the conduit 162 through a check valve 170 and also to the conduit 164 through a check valve 172. The inside of the sleeve member 168 is further fluidly connected to a reservoir 174 through an orifice 176.

With the above arrangement, the control cylinder 126 does not supply the actuator cylinder 128 with hydraulic fluid under pressure so long as the displacement of the pistons 132 and 134 and the rod 140 out of the neutral positions thereof is smaller than a predetermined value, i.e., unless the aforementioned displacement of the pistons 132 and 134 and the rod 140 becomes so large as to allow either of the ports 146 and 148 to communicate the corresponding chamber 136 or 138. By this, when the difference in pressure between the chambers 136 and 138 is smaller than a predetermined value, i.e., when the torque or effort with which the steering wheel 72 is turned is smaller than a predetermined value, the rear road wheels 60 and 62 are not turned but held in the straight ahead positions thereof.

When, however, the steering wheel 72 is turned to the left or in the counterclockwise direction with a torque or effort larger than a predetermined value, the difference in pressure between the chambers 136 and 138 becomes larger than the predetermined value $P_0$. The pistons 132 and 134 are thus caused to move in the rightward direction in the drawing to a considerable extent and allow the port 148 to provide communication between the chambers 138 and 160. In this instance, the chamber 158 of the actuator cylinder 128 is drained into the reservoir 104 since it is communicated with the chamber 136 of the control cylinder 126 through the port 146, the chamber 150 and the grooves 149. Further, the sleeve member 168 of the clamping device 166 is supplied with hydraulic fluid under pressure from the chamber 138 and releases the actuator rod 154 from the clamping. The actuator rod 154 is thus allowed to move in the leftward direction in the drawing by the amount corresponding to the difference in pressure between the chambers 158 and 160, whereby to cause the rear road wheels to turn to the right by the angle corresponding to the displacement of the actuator rod 154. When the torque or effort upon the steering wheel 72 reduces and becomes smaller than a predetermined value, the actuator rod 154 returns to the neutral position thereof allowing the rear road wheels 60 and 62 to return to the straight ahead positions thereof under the action of the springs 162 and 164. The actuator rod 154 is then clamped by the clamping device 166 stationarily relative to the housing 152 since the hydraulic fluid under pressure having been supplied into the inside of the sleeve member 168 is drained through the orifice 176 into the reservoir 174.

Conversely, when the steering wheel 72 is turned to the right or rotated in the clockwise direction with a torque or force larger than a predetermined value, the other chambers 136 and 138 are pressurized to cause the actuator rod 154 to move in the rightward didrection in the drawing where by to turn the rear wheels 60 and 62 to the left.

With the above arrangement, it therefore becomes possible for the vehicle to make turns of relatively small radii to the left or right.

Figure 6:
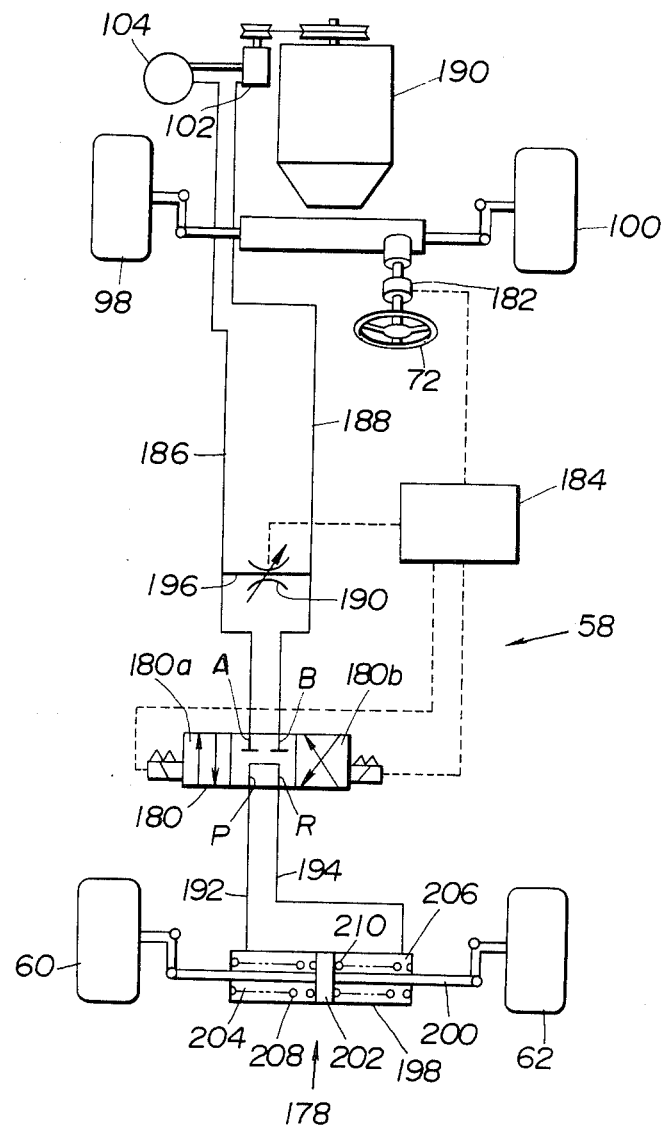
FIG. 6 is a schematic plan view of a vehicle equipped with a steering system according to another modification of the present invention.

FIG. 6 shows another modified embodiment in which like or corresponding parts to those of the previous embodiment of FIG. 2 are designated by the identical reference numerals.

This embodiment differs from the previous embodiments in that an actuator 58 for steering the rear road wheels 60 and 62 mainly consists of an actuator cylinder 178, a directional control valve 180, a sensor 182 for detecting the torque or force applied upon the steering wheel 72 to rotate the same, and a controller or control circuit 184 for controlling the directional control valve 180 in response to the output signal from the sensor 182.

The control valve 180 is of the four port, three position, closed center type and comprises A, B ports respectively connected through conduits 186 and 188 to the reservoir 104 and the pump 102 driven by an engine 190 and P, R ports respectively connected through conduits 192 and 194 to the actuator cylinder 178. The directional control valve 180 is actuated by electrical signals which the control circuit 184 produces in response to outputs of the steering torque sensor 182. More specifically, the steering torque sensor 182 is adapted to produce positive and negative electrical signals indicative of the direction of rotation of the steering wheel 72 and the magnitude of torque or force with which the steering wheel is rotated. The control circuit 184 includes an amplifier circuit for amplifying an electrical signal applied thereto from the steering torque sensor 182 and a comparator for deciding whether the voltage of the electrical signal is larger than a predetermined value. When the voltage of the electrical signal is higher than the predetermined value, the control circuit 184 produces electrical signals for causing the directional control valve to assume a predetermined position and also causing a throttle valve 195 throttle flow of hydraulic fluid in a conduit 196 interconnecting the conduits 186 and 188.

The actuator cylinder 178 comprises a hollow cylindrical housing 198 through which a reciprocative actuator rod 200 passes to project from the opposed ends thereof. The actuator rod 200 is operatively connected at the opposed ends thereof to the rear road wheels 60 and 62 in a manner similar to the previous embodiment of FIG. 2. An annular piston 202 is slidably disposed in the housing 198 in a manner to define a pair of chambers 204 and 206 on the opposed end sides thereof and is fixedly mounted on the actuator rod 200 to move together therewith. A pair of coil springs 208 and 210 are respectively disposed in the chambers 204 and 206 in such a manner as to urge the piston 202 toward the neutral position thereof or the axially central position in the housing 198. The chamber 204 is fluidly connected to the P port of the directional control valve 180 through the aforementioned conduit 192 while the chamber 206 is to the R port through the conduit 194. The actuator cylinder 178 is operative to turn the rear road wheels 60 and 62 to the left or right when the directional control valve 180 is actuatued to communicate the chamber 204 or 206 of the actuator cylinder 178 to the pump 102.

With the above arrangement, when the steering wheel 72 is turned to the left or right, the steering torque sensor 182 supplies the control circuit 184 with an electrical signal indicative of the direction of turning of the steering wheel and the magnitude of torque or effort with which the steering wheel is turned. When, however, the voltage of the electrical signal is smaller than a predetermined value, i.e., the torque or effort with which the steering wheel 72 is turned is smaller than a predetermined value, the directional control valve 180 is not actuated by the control circuit 84 but is held in the closed center position. As a result, the rear road wheel 60 and 62 are not steered but held in the straight ahead positions thereof irrespective of the turning of the front road wheels 98 and 100.

When the steering wheel 72 is turned to the left with a torque or effort larger than a predetermined value, the control circuit 184 causes the throttle valve 195 to throttle the flow of hydraulic fluid in the conduit 196 and at the same time actuates the directional control valve 180 to assume a valve position 180a, whereby to communicate the chamber 206 to the pump 102 through the conduits 194 and 188 while at the same time the chamber 204 to the reservoir 104 through the conduits 192 and 186. The actuator rod 200 is thus caused to move to the left in the drawing, whereby to turn the rear road wheels 60 and 62 to the right.

When the torque or effort upon the steering wheel 72 reduces and becomes smaller than the predetermined value, the conduit 196 is re from is released from the throttling by the throttle valve 195 while the directional control valve 180 is allowed to return to the central position thereof shown in the drawing, thus allowing hydraulic fluid from the pump 102 to flow through the conduit 196 into the reservoir 104 and at the same time communicating the chambers 204 and 206 with each other. The actuator rod 200 is thus caused to return to the neutral position thereof by the action of the springs 208 and 210, causing the rear road wheels 60 and 62 to return to the straight ahead positions thereof.

On the other hand, when the steering wheel 72 is turned to the right with a torque or effort larger than a predetermined value, the throttle valve 195 is caused to throttle fluid flow in the conduit 19 while the directional control valve 180 is actuated to assume a valve position 180b, thus communicating the chamber 204 to the pump 102 and at the same time the chamber 206 to the reservoir 104. The actuator rod 200 is thus caused to move in the rightward direction in the drawing, whereby to turn the rear road wheels 60 and 62 to the left.

With the above arrangement, it therefore becomes possible for the vehicle to make turns of relatively small radii to the left or right.

While the steering torque sensor 182 has thus been described and shown, it may be of such type, when a rack and pinion steering gear is used, that is adapted not to detect a steering torque directly but to determine the same through detection of reaction of a rack in response to turning of a steering wheel.

What is claimed is:

1. A steering wheel system in a motor vehicle having steerable front and rear road wheels, comprising:
    a steering wheel for turning the front road wheels;
    means for holding the rear road wheels fixed in a neutral position so long as the steering wheel is turned with a steering effort of a torque of no more than a predetermined value, and
    means for turning the road wheels only in the direction opposite to the direction of turning of the front road wheels and only when said steering wheel is turned with a torque larger than the predetermined value.

2. A steering system as set forth in claim 1, further comprising, a power steering device having a hydraulic servo including a pair of servo chambers fluidly separated by a servo piston and having one of said chambers pressurized while the other is drained when assisting turning of the front road wheels, and a reciprocative actuator rod connected at opposed ends thereof to the rear road wheels in such a manner as to turn the same when displaced from a neutral position thereof, said holding means comprising means for holding said actuator rod fixed at the neutral position so long as the difference in pressure between said servo chambers is no more than a predetermined value corresponding to said predetermined steering effort torque and said turning means comprises a hydraulic piston means fixed upon said actuator rod to move said rod only in response to a difference in pressure between said servo chambers larger than said predetermined value corresponding to said predetermined steering effort torque.

3. A steering system in a motor vehicle having steerable front and rear road wheels, comprising:
    a steering wheel for turning the front road wheels;
    means including an actuator for actuating the rear road wheels to turn in the direction opposite to the direction of turning of the front road wheels only when said steering wheel is turned with a torque larger than a predetermined value; and
    a power steering device having a hydraulic servo including a pair of servo chambers separated by a servo piston and having one of said chambers pressurized while the other is drained when turning the front road wheels;
    said actuator comprising a reciprocative actuator rod connected at opposed ends thereof to the rear road wheels in such a manner as to turn the same when displaced from a neutral position thereof, a holding means for holding said actuator rod at the neutral position so long as the difference in pressure between said servo chambers is smaller than a predetermined value, an actuator housing through which said actuator rod passes to project from the opposed ends thereof, said actuator housing having a pair of smaller-diameter cylindrical actuator chambers and a larger-diameter cylindrical actuator chamber interposed between said smaller-diameter actuator chambers in a manner to define a pair of annular shoulders at the opposed ends thereof;
    said holding means comprising a pair of annular spring seats slidably disposed in said larger-diameter actuator chamber and also slidably mounted on said actuator rod and a coil spring interposed between said spring seats and placed around said actuator rod in a manner to urge said spring seats against said shoulders;
    said actuator further comprising a pair of annular actuator pistons slidably disposed in said respective smaller-diameter actuator chambers to fluidly separate same from said larger-diameter actuator chamber and fixedly mounted on said actuator rod in a manner to contact said respective spring seats when said actuator rod is in the neutral position thereof, said smaller-diameter actuator chambers being fluidly connected to said servo chambers in such a manner that said actuator rod is actuated to move in the direction opposite to the direction of movement of said servo piston.

4. A steering system as set forth in claim 2, in which said holding means comprises a control cylinder having a control cylinder housing, a pair of control cylinder pistons slidably disposed in said control cylinder housing to define a pair of first and second control cylinder chambers on the remoter end sides thereof, said control cylinder pistons being axially spaced from each other to define therebetween a third control cylinder chamber and joined by a control cylinder rod so as to be movable together, a pair of coil springs respectively disposed in said first and second control cylinder chambers so as to urge said control cylinder pistons and said control cylinder rod toward a neutral position thereof, said first and second control cylinder chambers being fluidly connected to said respective servo chambers, a pair of ports formed in said control cylinder housing in such a manner as to partially open to said third control cylinder chamber and be partially closed by closer end portions of said respective control cylinder pistons, said control cylinder housing having a first cylindrical inner wall defining said first control cylinder chamber and a second cylindrical inner wall defining said second control cylinder chamber, and at least two axial grooves respectively formed in said first and second inner walls in such a manner that when displacement of said control cylinder pistons and said control cylinder rod out of the neutral position thereof becomes larger than a predetermined value to allow one of said ports to open to one of said control cylinder chambers, one of said groove associated with the other of said control cylinder chambers bypasses corresponding one of said control cylinder pistons to communicate the other of said ports to the other of said control cylinder chambers through said third control cylinder chamber, and in which said actuator further comprises an actuator cylinder having an actuator cylinder housing through which said actuator rod passes to project from the opposed ends thereof, an annular actuator cylinder piston slidably disposed in said actuator cylinder housing in a manner to define a pair of actuator cylinder chambers and fixedly mounted on said actuator rod to move together therewith, a pair of coil springs respectively disposed in said actuator cylinder chambers in such a manner as to urge said actuator rod toward the neutral position thereof, said actuator cylinder chambers being fluidly connected to said respective ports in said control cylinder housing in such a manner that said actuator rod is actuated to move in the direction opposite to the direction of movement of said servo piston.

5. A steering system as set forth in claim 4, in which said actuator further comprising a clamping means for clamping said actuator rod stationarily relative to said actuator cylinder housing when the difference in pressure between said servo chambers is smaller than the predetermined value and releasing said actuator rod from the clamping when said difference becomes higher than the predetermined value.

6. A steering system as set forth in claim 5, in which said clamping means comprises a radially expansible sleeve member placed around said actuator rod and radially expansible to release said actuator rod from the clamping when the inside of the sleeve member is pressurized and radially contractible to clamp said actuator when the inside of the sleeve member is drained, the inside of said sleeve member being fluidly connected in parallel to said ports by respectively interposing therebetween check valves and also to a reservoir through an orifice.

7. A steering system as set forth in claim 1, in which said actuator comprises an actuator cylinder having a reciprocative actuator rod connected at the opposed ends thereof to the rear road wheels in such a manner as to turn the same when displaced from a neutral position thereof, an actuator cylinder housing through which said actuator rod passes to project from the opposed ends thereof, an annular piston slidably disposed in said housing to define a pair of actuator cylinder chambers and fixedly mounted on said actuator rod to move together therewith, and a pair of coil springs respectively disposed in said actuator cylinder chambers in such a manner as to urge said actuator rod toward the neutral position thereof, said actuator further comprising a sensor for sensing the direction of turning of said steering wheel and the magnitude of torque applied upon same and producing signals indicative thereof, a hydraulic fluid reservoir, a pump fluidly connected to said reservoir, a directional control valve operative to fluidly connect and disconnect said actuator cylinder chambers to and from said pump and said reservoir, a control means for controlling a valve position of said directional control valve on the basis of the signals from said sensor in such a manner that when said torque is larger than a predetermined value, one of said actuator cylinder chambers is connected to said pump while the other is to said reservoir to cause said actuator rod to move in the direction corresponding to the direction of turning of said steering wheel, and a throttle valve interposed between said pump and said reservoir and controlled by said control means in such a manner as to provide less communication therebetween when said torque is smaller than the predetermined value and much communication when the torque is smaller than the predetermined value.

* * * * *